Dec. 31, 1929.      H. V. G. STOCKER      1,741,484
SAFETY DEVICE FOR AUTOMOBILES
Filed Nov. 18, 1927

INVENTOR.
H. V. G. Stocker,
BY
Edward N. Pagelsen
ATTORNEY.

Patented Dec. 31, 1929

1,741,484

UNITED STATES PATENT OFFICE

HATTIE V. G. STOCKER, OF NEW YORK, N. Y.

SAFETY DEVICE FOR AUTOMOBILES

Application filed November 18, 1927. Serial No. 234,254.

This invention relates to means for protecting the heads and necks of passengers of automobiles traveling over rough roads or when the vehicle is upset through accident and its object is to provide a resilient padding for automobile tops to soften the impact of passengers thrown against them and thereby prevent injury, particularly to women and children passengers who usually ride on the back seats.

This invention consists in a resilient pad attached to or built into the top of an automobile above the seats thereof and especially in the structure illustrated in the accompanying drawing and particularly pointed out in the claim of this specification.

Figure 1:
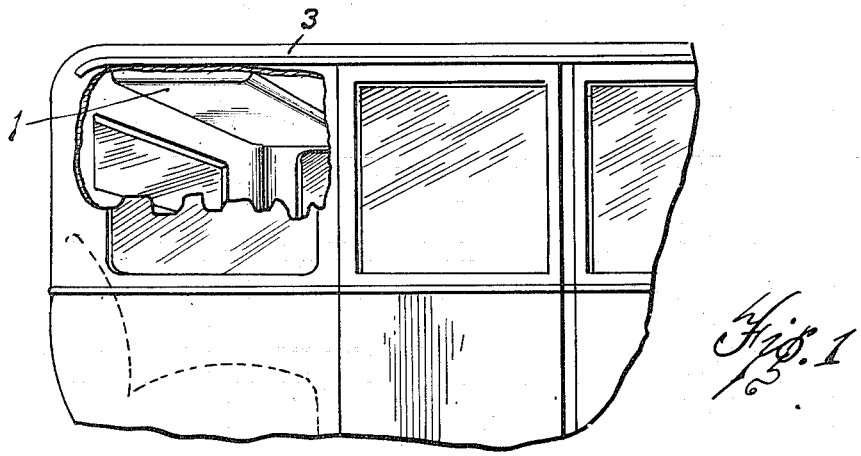
Figure 2:
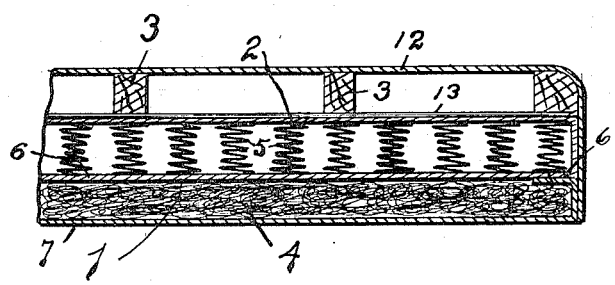
Figure 3:
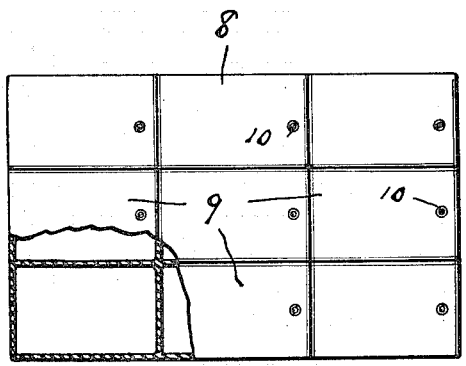

In the drawing, Fig. 1, is a perspective view of a portion of a vehicle top embodying the present invention. Fig. 2, is a section of a cushion and a portion of a vehicle top in which the cushion is mounted. Fig. 3, is a plan of a different type of cushion adapted for the present invention.

Similar reference characters refer to like parts throughout the several views.

Nearly every one who has ridden in the back seat of an automobile traveling over rough roads has been thrown up against the top and at one time or other, has suffered from the impact, and many riders have been seriously injured thereby, especially where the tops were of rigid construction, and these accidents occur in spite of rebound preventers, snubbers, or other devices provided to prevent them. The present invention consists in a pad or cushion 1 secured to the lower facing 2 of the top 12 of the vehicle or built into the top when originally constructed. The preferred construction of this cushion consists of a layer of felt, or other fibrous material and a layer of coil springs 5 spaced any desired distance apart, sheets 6 and 7 of woven fabric being employed to retain the layer 4. In order to render the cushion somewhat stiffer between the bows or frames 3, the rods, wires or cords 13 may be stretched across below these frames to receive the upward thrust of the springs 5 which are positioned between these frames. The rods or wires are preferably tempered so as to absorb the shocks by their resilience. Any other desired means may be employed for this purpose.

Or the air cushion 8 may be substituted for that just described, this cushion being formed of smaller units 9 if desired, each provided with its own air-valve 10.

Cushions of any other desired construction may be used in place of those shown and the dimensions may be varied to fit them to the tops in which they are to be mounted, the length depending on the seats whose occupants are to be protected, the pads extending over one or more of the seats as desired.

I claim:—

A vehicle body comprising a top having transversely extending frame members, an outer covering over said frame members, a cushion on the inner side of at least a position of the top comprising a lower layer of fibrous material and an upper layer of springs, and tempered shock-absorbing means extending across the inner side of said frame members between the frame members and the cushion to receive the upward thrust of the cushion between the frame members.

HATTIE V. G. STOCKER.